April 7, 1942.  J. YOUHOUSE  2,278,604
BRUSH RIGGING
Original Filed July 18, 1940
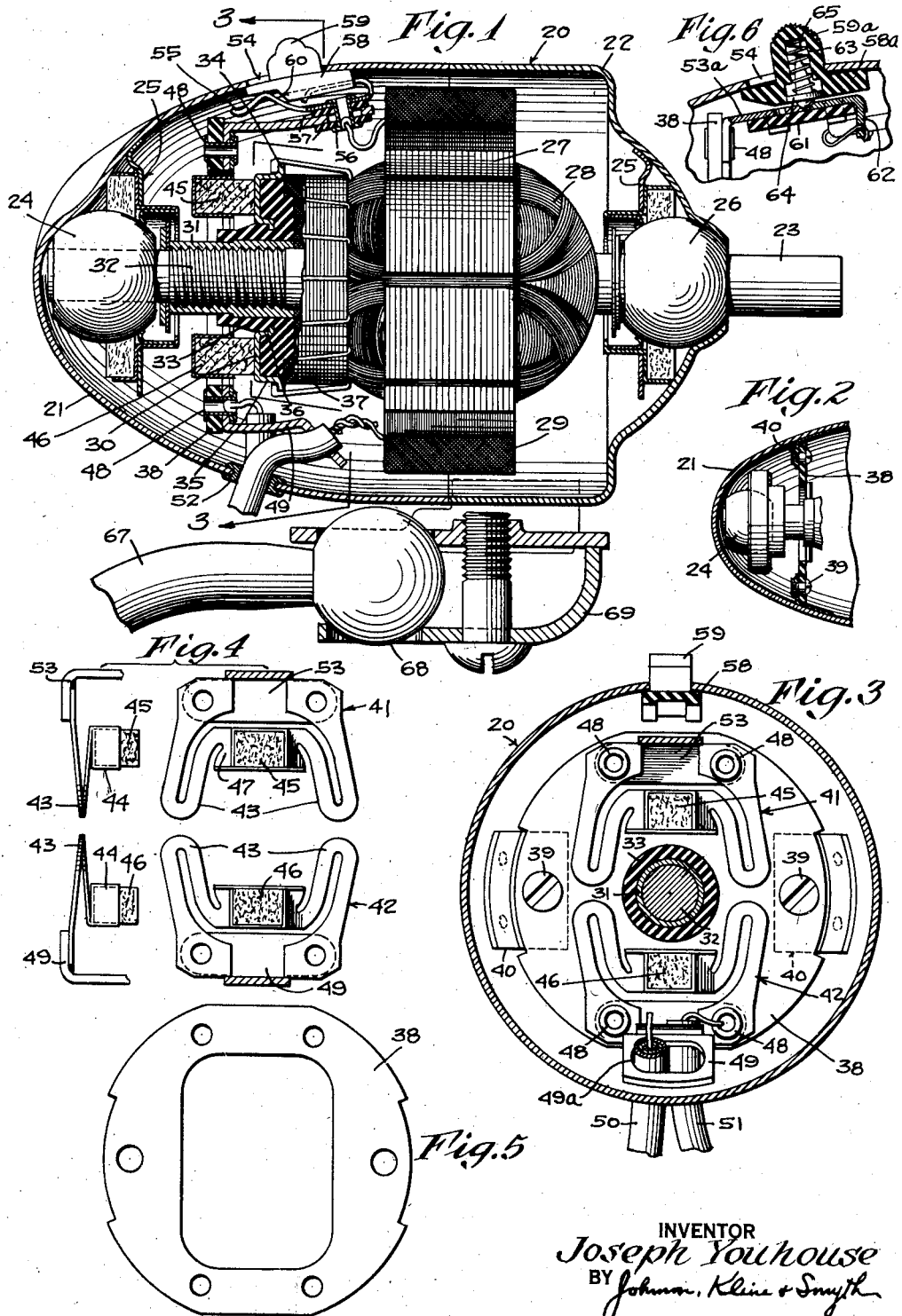
INVENTOR
Joseph Youhouse
BY Johnson, Kline + Smyth
ATTORNEYS Patented Apr. 7, 1942

2,278,604

UNITED STATES PATENT OFFICE 2,278,604

BRUSH RIGGING

Joseph Youhouse, Fairfield, Conn., assignor to Casco Products Corporation, Bridgeport, Conn., a corporation of Connecticut Original application July 18, 1940, Serial No. 346,095. Divided and this application May 27, 1941, Serial No. 395,369

13 Claims. (Cl. 171—324)

The present invention relates to a brush rigging for electric motors, especially small electric motors of the direct current type.

This application is a division of my copending application Serial No. 346,095, filed July 18, 1940.

Small electric motors of the aforesaid type are used particularly for driving auxiliary devices for automotive vehicles, such as horns, fans for heaters, ventilators, defrosters, and similar devices, and may also be used for other purposes, such as driving dental or surgical implements, small power tools, etc.

When such motors are used for driving fans, it is desirable that the outer surface of the motor be streamlined to offer a minimum resistance to the flow of air around the motor, and to improve the appearance of the device.

Small direct current motors generally comprise a rotary armature having windings connected to a commutator engaged by stationary brushes. The motor is enclosed in a housing carrying a salient pole field structure magnetized by field windings, the poles being disposed around the armature so that the magnetization of the poles reacting upon the energized armature provides a torque for turning the latter.

The ordinary type of commutator comprises a cylindrical contact surface. The brushes are radially supported by a brush rigging and urged against the commutator by springs positioned behind the brushes in sockets carried by the brush rigging. To provide electrical connections to the brushes, pigtails are ordinarily used.

The manufacture of the brush rigging parts and the assembly thereof in such motors is relatively complicated and expensive, and the arrangement of the brush rigging and commutator does not economically utilize the available space in a stream lined motor. The pigtail connections add to the manufacturing cost and increase the liability of the brushes to break.

The objects of the present invention include the provision of a brush rigging for motors of the aforesaid type, of simple and inexpensive construction, the parts of which may be cheaply and conveniently assembled and manufactured, especially by stamping and molding processes. Furthermore, it is an object to provide a brush rigging especially for use with a face type commutator, occupying little space and adapting itself to the contour of a streamlined motor, and thereby permitting material reduction in the size of the motor.

The novel brush rigging, according to the present invention, requires no separate springs or pigtail connections, but performs itself the combined functions of holding the brushes, tensioning them against the commutator and providing an electrical connection thereto.

When used with a face-type commutator, the brush rigging of the present invention, may be fitted conveniently into the space provided by a streamlined casing, and thus permits a material reduction in the size of the motor.

The said brush rigging may also include a switch adapted to be operated by a finger piece protruding from the side of the casing. As the switch may be assembled with the brush rigging before it is mounted in the motor casing, the switch assembly is rendered convenient and economical.

In the specific embodiment of the invention, herein illustrated, the brush rigging is shown as applied to a small fan motor of the commutator type suitable for six-volt direct current use. However, the use of the invention is not limited to this specific type of motor.

Other features and advantages will appear hereinafter from the following description, referring to the accompanying drawing, which shows a preferred embodiment of the invention, wherein Figure 1 is a vertical axial cross-sectional view of a motor including the brush rigging arrangement of the present invention.

Fig. 2 is a horizontal axial cross-section of one end of the motor shown in Fig. 1, showing means for securing the brush rigging to the motor casing.

Fig. 3 is a view in cross-section substantially along the line 3—3' in Fig. 1, through the motor casing and switch, showing the brush assembly of the motor.

Fig. 4 is a detail of the brushes and brush rigging in front and side elevation.

Fig. 5 is a detail in front elevation of the insulating frame which carries the brush rigging of Fig. 4.

Fig. 6 is a fragmentary detail of an alternate form of motor switch shown in vertical longitudinal cross-section.

Referring to the drawing, the motor, according to the present invention, comprises a casing 20 having thin walls, preferably formed of metal and having a generally elongate semiovate shape. The rear portion of the casing, at the left in Fig. 1, is closed and streamlined so that if the motor is used for driving a fan, there are no vertical obstructions which would cause resistance due to eddy currents in the air passing to the fan blades. The forward end of the casing is relatively flattened, protruding at the center to accommodate a bearing assembly.

The casing 20 is made up of a rear section 21 and a forward section 22, the line of separation between the two sections being shown adjacent the forward end of the motor and substantially perpendicular to the axis thereof.

Shaft 23 is supported in an anti-friction bearing 24 secured by means of plate 25 to the rear end of casing section 21, the shaft being journaled in a similar bearing 26, secured by means of a similar plate at the forward end of casing section 22.

Adjacent the forward end of the motor, the shaft 23 carries a laminated armature core 27, supporting the usual armature windings 28, while a field winding 29 is attached to the casing, and surrounds the armature core.

A commutator 30 is mounted on the shaft on the side of the armature facing the rear end of the motor, and is connected in the usual manner to the armature windings. The commutator 30 comprises a central sleeve 31 internally threaded and engaging a correspondingly threaded portion 32 on the shaft 23. The commutator is of the face type, the segments thereof being carried by a mass of dielectric material 33 molded around sleeve 31. The armature windings 28 are connected to nibs 34 protruding from the outer edge of the commutator.

The form of commutator shown in the drawing, readily adapts itself to economical manufacture by mass production methods. A centrally apertured metal plate is formed with an outer cylindrical flange 35 carrying nibs 34. The edges of the central aperture are flanged in a manner as shown at 36 suitable for anchoring the plate in the molded dielectric plastic material 33. A plurality of radial slots are cut part way from the edge of the central aperture across the face of the plate. The latter is molded with a mass of moldable plastic resin, such as Bakelite, together with sleeve 31, the Bakelite embedding the flanged edge 36 of the aperture and extending into the radial slots. After molding, the slots are extended to the edge of the commutator by cutting the metal to form grooves, whereby the plate is divided into a series of separate segments.

In mounting the commutator 30 on shaft 23 a dielectric washer 37, forming a backing therefor is preferably positioned between the commutator and the armature windings, the connections from the latter being carried over the peripheral surface of the washer and connected to the nibs 34.

According to the present invention, the brush rigging comprises a plate 38 of insulating material, such as paper-base Bakelite, as a support, said plate having a central aperture to fit over the shaft 23 to the rear of commutator 30. Plate 38 is secured to the casing section 21 by screws 39 engaging threaded bosses 40 attached, for instance, by welding, to the inner surface of the semiovate casing section. The plate 38 carries the switch assembly and brush rigging, as well as a support for one of the power leads for connecting the motor to a source of electric current. All of these parts are assembled with the plate 38 before installing it in the motor casing. As shown in the drawing, only two screws are required for installation of the plate after the assembly of the parts supported thereby. Thus, the assembly thereof is rendered highly convenient and economical. The brush rigging comprises a pair of brush supports 41 and 42 which are mounted on plate 38, and made from a flat piece of resilient sheet metal, for instance, by suitable stamping processes. Essentially each of the brush supports comprises a pair of U-shaped portions 43, the ends of the outer legs of which are provided with means for securing the brush holder to the supporting plate 38, and the ends of the inner legs being joined by a bridge having means at its center forming a socket for the brush which extends outward substantially at right angles to the plane of the brush support. The flat U-shaped portions of the support constitute circuitous strips of resilient metal adapted to urge the brush against the face of the commutator 30.

Preferably, the sockets 44 for holding the brushes 45 and 46 are formed by a number of flanges and tabs bent outwardly from the central or transverse bridge portion 47 of the brush support so that the latter may be entirely formed from one piece of metal.

The ends of the brush supports 41 and 42 are secured, for instance, by eyelets 48 in preformed apertures adjacent opposite edges of the plate 38 so that the brushes will be supported in contact with the face of the commutator 38 on opposite sides of shaft 23. Before installation, the brush supports may be slightly bent, as indicated in Fig. 4, so that the brushes extend forwardly from the surface of the plate 38, resilient contact of the brushes with the commutator thus tending to retain the brushes normal to the commutator surface. The metal sockets holding the brushes provide adequate electrical connection therewith.

The hereindescribed brush supports avoid the necessity of providing separate springs for urging the brushes against the comutator, thus lowering the cost of the motor and its assembly, and avoiding the necessity of providing separate connections or pigtails to the brushes which are generally subject to damage from snapping off or breakage.

In Fig. 1, the lower pair of eyelets 48 securing brush support 42 to the plate 38, are also used to fasten a support 49 to the said plate for one or both of the power leads 50 and 51 entering the side of the casing section 21 through an aperture provided in a suitable insulating bushing 52 secured therein. The support 49 comprises a substantially T-shaped metal plate with its transverse portion bent substantially at right angles to the upright portions thereof. The transverse portion is secured by eyelets 48 to plate 38, and the upright portion extends outward substantially at right angles to the plate toward the field winding 29. The outer end is bent downward and is provided with an aperture 49a through which lead 50 extends. As indicated in Fig. 1, lead 50 is connected to one end of the field winding 29. The support effectively prevents any portion of the electrical connection of the field winding from coming in contact with the whirling armature or commutator, and thus prevents damage which might result from such contact.

The other power lead 51 also enters the casing through the insulating bushing 52 and is connected to the brush support 42, for instance, by soldering it to one of the eyelets 48 in contact with said brush support.

The opposite pair of eyelets 48 shown at the upper portion of Fig. 1, securing brush support 41 to the plate 38 are utilized to support a switch for starting and stopping the motor. The latter comprises a T-shaped metal piece 53, the transverse portion of which is bent at right angles to the upright portion, as shown in Figs. 1 and 3. The transverse portion is fastened by the eyelets 48 to the plate 38, in good electrical contact with brush support 41. The stem of the piece 53 extends substantially at right angles to plate 38 toward the field structure of the motor, directly below an elongated rectangular aperture 54 in the wall of the casing section 21.

A resilient contact strip 55 is secured to the end of the extending portion of metal piece 53 by means of an eyelet 56 carried in an aperture at the end of said extension by a pair of insulating washers 57 which normally insulate said contact strip and eyelet from the T-shaped metal support 53.

A finger piece for the switch is positioned in the elongated rectangular aperture 54 in the side of the motor casing 21, and is adapted to slide back and forth in the aperture in a direction parallel to the axis of the casing. The finger piece comprises a body portion 58 of dielectric material having an upper surface which fits the ovate curvature of the casing section 21 so that it may slide freely thereon. A button 59 extends from the center of the body portion 58 through the aperture in the casing section. The underside of the switch body 58 is longitudinally grooved, the groove engaging the resilient contact strip 55 at two points on opposite sides of the eyelet 56, said strip being bent in a manner so as to urge the switch body 58 resiliently against the inner surface of casing 20. One end of the contact strip 55 is also bent so that it extends close to the metal support 53. A shoulder 60 on the lower surface of the switch body 58 is adapted, when the latter is moved to the left in aperture 54 (referring to Fig. 1) to depress the left-hand end of contact strip 55 causing it to form a connection with the metal plate 53 and thus with brush holder 41 and brush 45.

The free end of the field winding 29 is permanently connected to the contact strip 55, for instance, by soldering it to eyelet 56.

This circuit of the motor when the switch is closed may be traced from lead 50, through field winding 29, to contact strip 55, through metal plate 53, brush support 41, and brush 45, to one side of the commutator 39 through the armature winding to the other side of said commutator, and through brush 46 and brush support 42 to the opposite lead 51. Motion of the button 59 to the right in Fig. 1 releases contact strip 55 from shoulder 60 and interrupts the circuit between contact strip 55 and metal plate 53 to stop the motor.

A modified form of motor switch is shown in Fig. 6. In this construction, a substantially T-shaped metal piece 53a having a shorter stem than the metal piece 53 is similarly attached by eyelets 48 to plate 38 and forms an electric connection with brush support 41. A plate of insulating material 61, secured to the lower surface of the upright extension of metal plate 53a protrudes beyond the end of the latter and carries an L-shaped metal strip 62, one end of which is spaced apart from the end of metal piece 53a. The switch comprises a body 58a and a button 59a supported in the rectangular aperture 54 in the wall of the motor casing 20 in a manner similar to the switch described above. The lower surface of the switch body 58a is provided with a bore 63 extending upward into the button 59a and a metal plunger 64 is mounted to slide in the said bore and resiliently urged by a spring 65 to engage the metal piece 53a and the metal strip 62.

When the switch is moved to the right in aperture 54, referred to Fig. 6, plunger 64 forms an electric contact bridging the space between metal plate 53a and the strip 62. When the switch is moved to the left, the connection between said plate and strip is broken. The free end of the field winding 29 is attached to strip 62. Hence, when the switch is moved to the right, the motor circuit is closed for motor operation, and when moved to the left, the circuit is interrupted to stop the motor.

A rod 67 is shown, adapted to support the motor casing by means of a ball and socket joint 68 and a clamp 69 adapted to tighten the joint to hold the motor in any desired position of adjustment on the end of the said rod.

In the motor described above, the use of a face type commutator and of the novel brush rigging of the present invention economically utilizes the space provided by the streamlined semi-ovate casing, thus reducing the size of the motor to a minimum.

The form of the brush rigging hereinbefore described renders the manufacture of this portion of the motor simple and economical, provides adequate resilient support for the brushes to urge them into contact with the face type commutator, and the construction of the brush sockets eliminates the necessity for using pigtail connections to the brushes.

The assembly of the brush rigging and switch support of the motor is convenient and economical and is well adapted for mass production methods. The brush rigging support not only carries the switch, but also provides support for the electric conductors in such a manner that damage which might result from their displacement and contact with moving parts of the motor is substantially prevented.

The motor may be readily dismantled for removal and replacement of the brushes, or brush rigging, and for repair of electric connections thereto.

Variations and modifications may be made within the scope of this invention and portions of the improvements may be used without others.

I claim:

1. In an electric motor having an armature and a commutator mounted on a rotatable shaft, and a casing enclosing said motor, a brush rigging comprising a fixed support mounted adjacent the commutator; a brush holder comprising a resilient strip of sheet metal; means for securing said strip to said support; and a plurality of tabs bent at right angles to the plane of the strip to form a socket for holding the brush, said resilient strip being adapted to urge said socket in the direction of the contact surface of the commutator.

2. In an electric motor having an armature rotatably supported on a shaft and a face-type commutator adapted to rotate with said armature, a brush rigging for holding a plurality of brushes in resilient engagement with said commutator and for providing an electrical connection with the brushes held thereby, comprising an insulating frame lying in a plane substantially parallel to the face of the commutator; and a plurality of brush holders, each comprising a strip of sheet metal of circuitous design lying substantially in a plane parallel to the face of the commutator, secured at each end to the insulating frame, and each including a brush-holding means intermediate the ends thereof.

3. In an electric motor having an armature rotatably supported on a shaft and a face-type commutator adapted to rotate with said armature, a brush rigging for holding a plurality of brushes in resilient engagement with said commutator and for providing an electrical connection with the brushes held thereby, comprising an insulating frame lying in a plane substantially parallel to the face of the commutator; and a plurality of brush holders, each comprising a strip of sheet metal of circuitous design lying substantially in a plane parallel to the face of the commutator, secured at each end to the insulating frame, and provided with outwardly bent tabs intermediate its ends to form a socket for holding a brush.

4. In an electric motor having an armature rotatably supported on a shaft, and a face-type commutator adapted to rotate with said armature, a brush rigging for holding a plurality of brushes in resilient engagement with said commutator and for providing an electrical connection with the brushes held thereby, comprising an insulating frame lying in a plane substantially parallel to the face of the commutator; and a plurality of brush holders, each comprising a strip of resilient sheet metal, lying substantially in a plane parallel to the face of the commutator, having a central portion including means for holding a brush, and a pair of U-shaped portions forming extensions at opposite ends of said central portion, the free ends of said U-shaped portions being fastened to the insulating frame.

5. In a device of the type described, a brush holder for use with a face-type commutator comprising a resilient piece of sheet metal, said sheet metal piece having end portions cut in a circuitous design; means at the terminals of said end portions for fastening the brush holder to a support; and a socket formed from the sheet metal at the midportion of said strip for receiving and supporting a brush extending outward from the brush holder substantially normal to the plane of the strip, said circuitous end portions providing resilient means for urging said brush against a face-type commutator.

6. In a device of the type described, a brush holder for use with a face-type commutator comprising a resilient piece of sheet metal, said sheet metal piece having end portions cut in a U-shaped design; means at the terminals of said end portions for fastening the brush holder to a support; and a socket formed from the sheet metal at the midportion of said strip for receiving and supporting a brush extending outward from the brush holder substantially normal to the plane of the strip, said U-shaped end portions providing resilient means for urging said brush against a face-type commutator.

7. In a device of the type described, a brush holder for use with a face-type commutator comprising a resilient piece of sheet metal, said sheet metal piece having end portions cut in a circuitous design; means at the terminals of said end portions for fastening the brush holder to a support; and a plurality of tabs bent at right angles to said midportion of the strip to form a socket for receiving and supporting a brush extending outward from the brush holder substantially normal to the plane of the strip, said circuitous end portions providing resilient means for urging said brush against the face-type commutator.

8. In a device of the type described, a brush holder for use with a face-type commutator comprising a resilient piece of sheet metal, said sheet metal piece having end portions cut in a circuitous design; means at the terminals of said end portions for fastening the brush holder to a support; a plurality of tabs bent outwardly in opposite directions from the midportion of said strip to form an aperture therein; and flanges around said aperture providing a socket at the midportion of said strip for receiving and supporting a brush extending outward from the brush holder substantially normal to the plane of the strip, said circuitous end portions providing resilient means for urging said brush against a face-type commutator.

9. In a device of the type described, a brush holder comprising a strip of resilient sheet metal having a central portion including a socket for holding a brush substantially normal to the plane of said portion; end portions of circuitous design; and means at the extremities of said end portions for securing them to a support, said end portions being slightly skewed to project the brush-holding socket yieldably outward from the support-engaging extremities to urge a brush positioned in the socket against an adjacent commutator surface.

10. In an electric motor having an armature and a commutator mounted on a rotary shaft and a casing enclosing said motor, a removable brush rigging comprising an insulated support means; a plurality of brushes; a plurality of brush holders secured to said support means including means for urging said brushes against the commutator; and switch means secured to aid support means for controlling a circuit including said brush holders, said assembly being removable as a unit from said casing.

11. In an electric motor having an armature and a commutator mounted on a rotary shaft, and a casing enclosing said motor, a removable brush rigging comprising an insulated support means; a plurality of brushes; a plurality of brush holders secured to said support means, and including means for urging said brushes against the commutator; switch means comprising a resilient contact and a fixed contact secured to said support means adjacent an aperture in the wall of the casing, said resilient contact being normally disengaged from said fixed contact; a finger piece supported against the inner wall of said casing having a button protruding through said aperture and laterally movable therein, said resilient contact urging said finger piece against the wall of the casing; and a cam surface on the finger piece for moving the resilient contact into and out of engagement with the fixed contact upon motion of said button to and fro in the aperture of the casing to open and close the circuit of the motor.

12. In an electric motor having an armature and a commutator mounted on a rotary shaft and a casing enclosing said motor, a removable brush rigging comprising an insulated support means; a plurality of brushes; a plurality of brush holders secured to said support means, and including means for urging said brushes against the commutator; switch means comprising a pair of spaced switch contacts insulatedly secured to said support adjacent an aperture in the casing, one of said contacts being connected to at least one of said brush holders; a finger piece supported against the inner wall of the casing having a button protruding through said aperture and laterally slidably therein; a bridging member adapted to bridge said spaced contacts to complete the motor circuit when the button is moved to one limit of its motion and to interrupt said circuit when moved to its other limit; and resilient means urging said bridging member into engagement with said contacts and said finger piece against the wall of the casing.

13. In an electric motor having an armature and a commutator on a rotatable shaft, and a casing enclosing the motor, a removable brush rigging comprising an insulated support means; a plurality of brush holders secured to said support means and including means for urging said brushes against the commutator; a rigid apertured finger secured to said support means adjacent an aperture in the wall of said casing; and a power lead entering said casing through said aperture and extending through the aperture in said finger, the latter retaining said lead against displacement within the casing.

JOSEPH YOUHOUSE.